Figure 1:
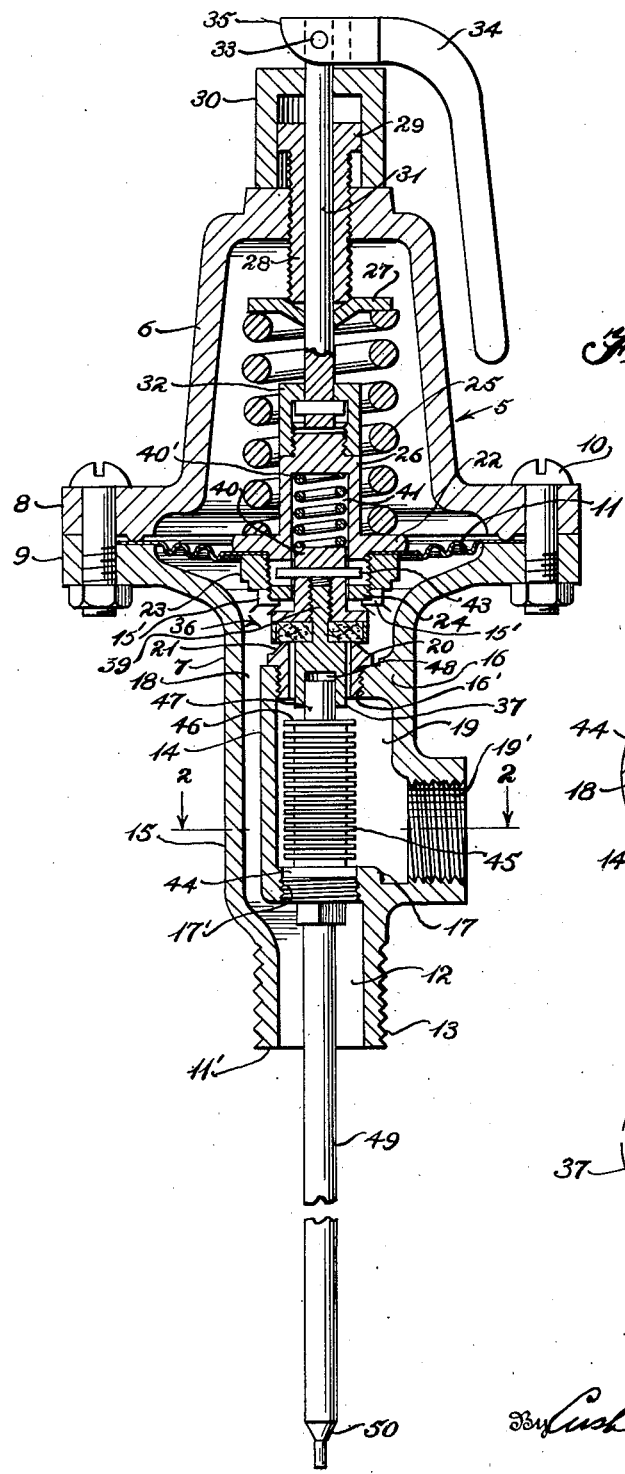

Feb. 14, 1950 F. L. BANNER 2,497,201
RELIEF VALVE
Filed Sept. 16, 1946

Inventor
Francis L. Banner

By Cushan Darby & Cushan
Attorneys

Patented Feb. 14, 1950

2,497,201

UNITED STATES PATENT OFFICE 2,497,201

RELIEF VALVE

Francis L. Banner, Decatur, Ill., assignor to Mueller Co., Decatur, Ill., a corporation of Illinois Application September 16, 1946, Serial No. 697,177

9 Claims. (Cl. 236—92)

This invention relates to valves designed to effect fluid relief when predetermined limits of temperature and pressure are exceeded. A principal object of the invention is to provide a relief valve which is easily assembled in its entirety and in particular as to the heat responsive actuating element. Another object is to provide a structure in which the heat responsive element is positioned so as to be normally out of contact with the heated fluid but in the path of flow of the heated fluid when relief occurs. Another object is to provide a simple and compact combined pressure and temperature responsive relief valve.

Figure 2:
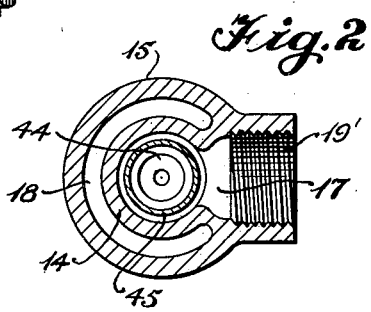
Figure 3:
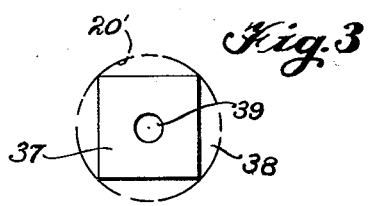

The invention is shown in illustrative embodiment in the drawing in which:

Figure 1 is an axial section of the valve.
Figure 2 is a section on line 2—2 of Figure 1.
Figure 3 shows a movable valve part in plan.

Reference numeral 5 generally designates a housing comprising a top part 6 and a bottom part 7 with opposed circular flanges 8 and 9 secured together by bolts 10 and clamping between them a diaphragm 11.

The lower portion 7 has an axially extending terminal neck 11' defining an inlet port 12 and provided with external threads 13 for the mounting of the valve as a whole in use. Inwardly of port 12 is a generally cylindrical partition portion 14 spaced from the generally cylindrical peripheral wall 15, portion 14 being joined top and bottom with the outer wall by horizontal partition portions 16 and 17 so that, in conjunction with the diaphragm, there is provided an inlet chamber 18. An outlet chamber 19 is defined by portions 14, 16 and 17, and has an outlet port 19'.

Wall portion 17 is provided with a threaded bore 17' smaller than and aligned with inlet 12, and wall 16 is provided with a threaded bore 16' aligned with bore 17' and the inlet bore. Threaded in bore 16' is a ring member 20 which provides a valve seat 21 faced toward the diaphragm.

The diaphragm has an axial opening whose margins are clamped between pressure plates 22 and 23, the latter being constituted as a nut threaded on a downwardly projecting boss portion 24 of plate 22. A compression spring 25 surrounds an upward extension 26 of plate 22 and bears against the latter at its lower end, the upper end of the spring bearing against an abutment 27 whose top is engaged by a hollow screw 28 in turn engaged in a threaded axial bore of housing portion 6. The action of spring 25 is limited by the engagement of nut 23 with lugs 15' which project inwardly from the upper portion of wall 15. The head 29 of the screw 28 is protected by a guard in the form of an inverted cup 30 which is freely rotatable on housing portion 6 relative to the head so that once the screw has been adjusted, the adjustment cannot be altered without removing the guard. A rod 31 has its lower end swiveled to the top of extension 26 by means of a coupling member 32, the rod extending upwardly through screw 28 and a bore in the top of guard 30, the projecting extremity being pivoted by means of a pin 33 to a handle 34 having a cam portion 35 cooperable with the top of the guard 30. It will be evident that by swinging the handle counter-clockwise, Figure 1, the diaphragm can be lifted for test purposes.

Reference numeral 36 generally designates a movable valve member cooperative with seat 21. The valve member comprises a stem 37 which is guided for reciprocation in the seat ring 20. In Figure 3, the stem is shown as being of square section, guiding contact being provided by the corners of the square while four flow passages 38 are provided between the sides of the square and the bore 20' of ring 20. The stem 37 includes a reduced upwardly extending threaded portion 39 threaded into an axial bore of a head member 40 which is freely slidable in a bore 41 of pressure plate 22, the lower portion of the head being expanded to provide a cup receiving a gasket which is perforated to pass the threaded extension 39 of the stem portion 37 and is clamped against the top of the latter. The head portion 40 has a diametrical bore tightly receiving a pin 43 whose ends are slidingly received in diametrically opposite vertical slots formed in the boss portion 24, the ends of the pins being spaced from the upper and lower ends of the slots, as indicated in Figure 1, when the parts are in normal relation, i. e., nut 23 engaging lugs 15' and valve member 36 seated by a relatively light compression spring 40' in the upper part of bore 40. Thus, there is provided a lost motion connection between the valve 36 and the diaphragm 11, permitting limited movement of the valve relative to the diaphragm and of the diaphragm relative to the valve, as conditions require. The arrangement in many respects is like that shown in the patent to J. M. Wilkins, No. 2,074,292, March 16, 1937.

Threaded in the bore 17' is an annular fitting 44 to the top of which is fixed a bellows, or "Sylphon," 45 to the upper end of which is secured a plug 46 which includes an upwardly extending abutment stud 47 freely slidable in a bore 48 of stem 37 with a predetermined clearance between the top of the stud and the top wall of the bore, the bellows being of a size to be passed through a bore 17' in assembly. Thus, stud 47 has a one-way engagement with valve 36. Projecting downwardly from fitting 44, in communication through the fitting with the interior of the bellows, is a tube 49 which projects rectilinearly through the inlet port for subjection, when the valve is mounted, to the heat of the fluid to be controlled. The bellows and tube are filled with a sensitively heat-expansible fluid and the lower end 50 of the tube is closed in any suitable manner. It will be evident that in assembly the heat-expansible unit is positioned by passing the bellows through the inlet port and bore 17' to engage the stud 47 in the bore 48, and the fitting 44, which is passable through the inlet port, is threaded into bore 17' to form a seal therewith.

In use, the bellows is normally protected from contact with the heated fluid by the closed valve 36. When tube 49 is subjected to excessive heat the bellows will expand, and when stud 47 engages the top of bore 48 the valve member will be lifted against the force of spring 43' without interference from spring 25, this being permitted by the clearance above the ends of the springs 43. As soon as the valve starts to open, the escaping hot fluid contacts the bellows 45 with an accelerated expanding effect on the latter so that valve member 36 is quickly opened for full relief.

Upon the occurrence of excessive pressure, the lost motion connection between the diaphragm and valve member 36 will take effect to lift the valve member 36 without in any way affecting the bellows. Due to the lost motion connection, the occurrence of slight over-pressures will not affect valve member 36. The stud 47 and bore 48 are engaged for a sufficient height so that they will not separate upon maximum lift of the diaphragm.

The disclosure herein is given as illustrative of the invention which is susceptible of variations in the form and relation of parts within the scope of the claims which follow.

I claim:

1. A relief valve comprising a housing including a removable top part and a lower part having an inlet port and an outlet port, partition means dividing the interior of the lower part into an inlet chamber and an outlet chamber, an opening in the partition means having a surrounding margin on the inlet side of the partition means providing an upwardly facing valve seat, an upwardly movable valve member normally engaging said seat, a bellows below said valve in the outlet chamber exposed to flow therethrough, said bellows having its lower end rigidly connected to and supported by the lower housing and being disposed with its axis of expansion substantially aligned with said opening, an abutment on the upper end of the bellows adjacent said opening having a one-way engagement with said valve member to unseat the same when the bellows expands, and a tube communicating at one end with the lower end of the bellows and projecting through the inlet port, the other end of the tube being closed and the tube and bellows being filled with an expansible fluid, said valve being removable for replacement or repair, when the top housing part is removed, without disturbing the bellows and the tube.

2. A relief valve comprising a housing having an inlet port and an outlet port, partition means dividing the housing interior into an inlet chamber and an outlet chamber, an opening in the partition means having a surrounding margin on the inlet side of the partition means providing a valve seat, a movable valve member normally engaging said seat, another opening in said partition means, a bellows in the outlet chamber exposed to flow therethrough, a fitting at one end of the bellows sealed in said other opening and serving to support the bellows, means between the other end of the bellows and said valve member for communicating expanding movement of the bellows to the valve member to unseat the same, and a tube communicating at one end with the bellows through said fitting and projecting through the inlet port, the other end of the tube being closed and the tube and bellows being filled with an expansible fluid.

3. A relief valve comprising a housing having an inlet port and an outlet port, partition means dividing the housing interior into an inlet chamber and an outlet chamber, an opening in the partition means having a surrounding margin on the inlet side of the partition means providing a valve seat, a movable valve member normally engaging said seat, another opening in said partition means, said other opening being substantially aligned with the first opening, a bellows in the outlet chamber exposed to flow therethrough, a fitting at one end of the bellows sealed in said opening and serving to support the bellows for expansion toward the first opening, an abutment on the other end of the bellows engaging said valve member to unseat the same when the bellows expands, and a tube communicating at one end with the bellows through said fitting and projecting through said inlet port, the other end of the tube being closed and the tube and bellows being filled with an expansible fluid.

4. Structure according to claim 3 wherein the inlet port is on the opposite side of said other opening from the first opening and said tube projects rectilinearly therethrough.

5. A relief valve comprising a housing having an inlet port and an outlet port, partition means dividing the housing interior into an inlet chamber and an outlet chamber, an opening the partition means having a surrounding margin on the inlet side of the partition means providing a valve seat, a movable valve member normally engaging said seat, said movable valve member including a stem slidable in said opening for guiding said valve member for reciprocation, a flow channel between the stem and the surrounding wall of the opening, a bellows in the outlet chamber exposed to flow therethrough, said bellows being aligned with said stem and engaging the latter upon expansion to unseat the valve member, and a tube communicating at one end with the bellows and projecting through the inlet port, the other end of the tube being closed and the tube and bellows being filled with an expansible fluid.

6. Structure according to claim 1 wherein the housing includes a spring-loaded diaphragm having a lost motion connection with said valve member whereby to unseat the same upon subjection of the diaphragm to excessive pressure, said connection providing a free range of movement for the valve member relative to the diaphragm under the unseating action of said bellows.

7. A relief valve comprising a housing including two parts and a diaphragm clamped therebetween, one of said parts having an inlet port and and outlet port and partition means serving with said diaphragm to define an inlet chamber and an outlet chamber in said one of said parts, said partition means including a partition opposite the diaphragm provided with an opening having a surrounding margin opposed to the diaphragm and constituting a valve seat, spring means in said other part urging the diaphragm toward said seat, means limiting the action of said spring means, a movable valve member normally engaging said seat, a lost-motion connection between said diaphragm and valve member, whereby the diaphragm and valve member are free to move relative to each other, another opening in said partition means opposite the first, a bellows in the outlet chamber exposed to flow therethrough, a fitting at one end of the bellows sealed in said second opening and serving to support the bellows for expansion toward the first opening, an abutment on the other end of the bellows engaging said valve member to unseat the same by lost motion relative to said diaphragm when the bellows expands, and a tube communicating at one end with the bellows through said fitting and projecting through said inlet port, the other end of the tube being closed and the tube and bellows being filled with an expansible fluid.

8. Structure according to claim 7 wherein the inlet port is on the opposite side of said other opening from the first opening and said tube projects rectilinearly therethrough.

9. Structure according to claim 3 wherein the inlet port is on the opposite side of said other opening from the first opening and said tube projects rectilinearly therethrough, said bellows being of a size to be passed through said inlet port and said other opening to the outlet chamber, and said fitting being of a size to be passed through said inlet port and being threaded in said other opening.

FRANCIS L. BANNER.

REFERENCES CITED

The following references are of record in the file of this patent:

UNITED STATES PATENTS

| Number | Name | Date |
|---|---|---|
| 2,035,512 | Smith | Mar. 31, 1936 |
| 2,074,292 | Wilkins | Mar. 16, 1937 |
| 2,223,115 | McDermott | Nov. 26, 1940 |
| 2,400,615 | Warrick et al. | May 21, 1946 |